March 16, 1965  J. W. WIGGINS  3,173,249
AIR-BREATHING SOLID PROPELLANT DUCTED ROCKET
Filed Aug. 10, 1959  2 Sheets-Sheet 1

INVENTOR.
J. W. WIGGINS
BY
Curtis, Morris & Safford

March 16, 1965  J. W. WIGGINS  3,173,249
AIR-BREATHING SOLID PROPELLANT DUCTED ROCKET
Filed Aug. 10, 1959  2 Sheets-Sheet 2
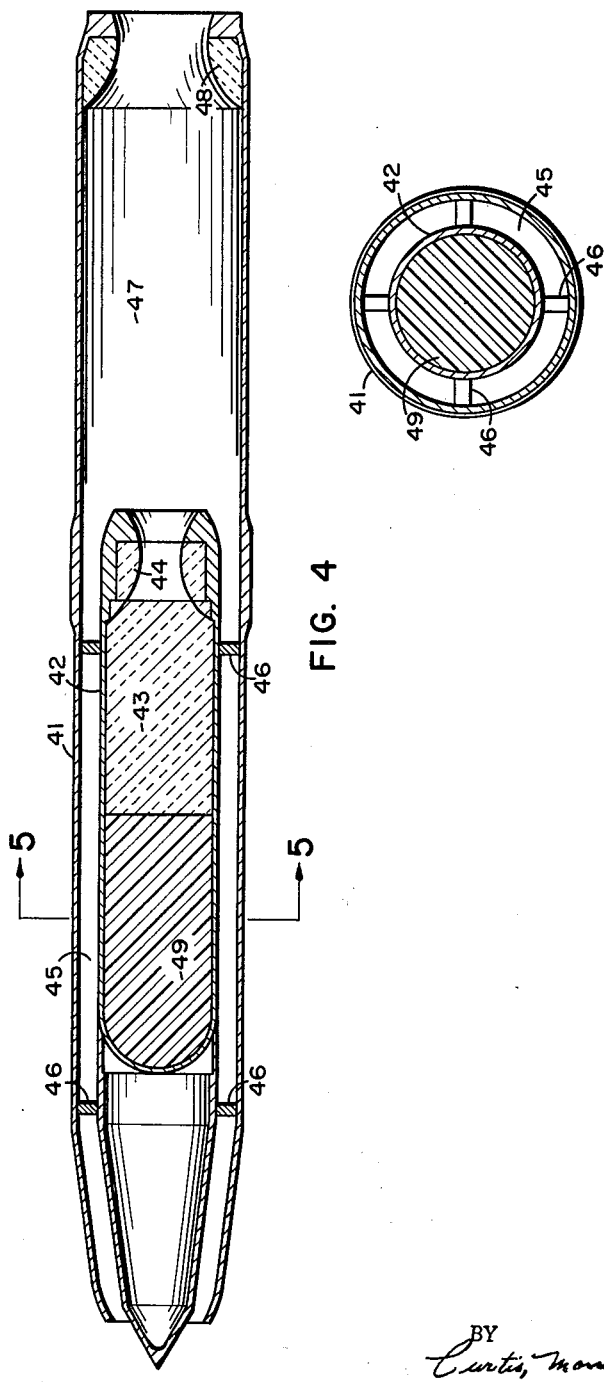
INVENTOR.
J. W. WIGGINS
BY
Curtis, Morris Safford

United States Patent Office 3,173,249
Patented Mar. 16, 1965

3,173,249
AIR-BREATHING SOLID PROPELLANT
DUCTED ROCKET
Joseph W. Wiggins, Huntsville, Ala., assignor to Thiokol Chemical Corporation, Bristol, Pa., a corporation of Delaware
Filed Aug. 10, 1959, Ser. No. 832,585
2 Claims. (Cl. 60—35.6)

This invention relates to improvements in solid propellant rockets and relates in particular to a solid propellant air-breathing ducted rocket.

A solid propellant ducted rocket is a hybrid type propulsion system consisting of a solid propellant rocket motor in combination with an inlet air duct. The rocket motor contains a solid propellant of low oxidizer content, which upon burning discharges a fuel-rich gas into an afterburner section. In the afterburner this fuel-rich gas mixes with air delivered by a diffuser system through a duct into the afterburner and is ignited by the flame from the rocket motor. Acceleration of the combustion gases through the exhaust nozzle produces thrust or motive force for the vehicle being propelled by the rocket motor.

It is well known that a requirement of both liquid and solid propellant rocket motors is that an oxidizing agent be supplied to the propellant fuel so that fuel can burn. If a rocket is to be independent of its environment and self-sufficient in providing its own thrust, it must carry its own oxidizer. This is commonly done in typical liquid and solid fuel rockets.

If a rocket derives all or part of its oxidizer from the atmosphere through which it is being propelled, the amount of oxidizer the rocket must carry is reduced, thus enabling the rocket to carry more fuel or missile payload.

Attempts to utilize atmospheric air as an oxidizer have been successful in other aircraft by using a ramjet type motor. But a ramjet, which conventionally employs a liquid fuel, is subject to several operational disadvantages, such as complicated fuel delivery systems, flameholders, provision for reignition of the fuel in case of flameout, and elaborate devices for thrust stabilization and for maintaining constant speed through regions of varying air density, such as in flight from lower to higher altitudes.

The present invention relates to an air-breathing ducted rocket employing a substantially solid propellant for producing a reactive thrust to propel the rocket. This solid propellant may be deficient in the amount of oxidizer incorporated therein which is needed for combustion of the fuel. Additional oxidizer is supplied by the intake of atmospheric air. Such a rocket possesses many desirable features of a conventional ramjet but additionally has the advantage of a simple structure and an absence of the moving parts found in a typical ramjet motor. A ducted rocket motor of the kind herein described has no moving parts and on the whole presents none of the serious design problems of a ramjet, such as complicated fuel metering and delivery systems.

By utilizing the atmosphere as an oxidizer, the impulse (the product of thrust and time) obtainable per unit weight of propellant and, thus, the total impulse of the rocket motor are greatly increased, since most of the oxidizer needed for complete combustion of the rocket fuel is not carried within the rocket vehicle itself. Also, the thrust per unit frontal area of such a rocket can be high. This ratio must often be limited to relatively low values in ramjets because of flameout problems.

The structure of the present invention eliminates the many kinds of ignition and reignition problems attendant upon ramjets or similar thrust devices. Ramjets require flameholders and the like to sustain ignition or to effect reignition if excess thrust causes a flameout. In an air-breathing ducted rocket the temperature of the hot combustion gases expelled from the motor section, or primary combustion chamber, into the afterburner, or secondary combustion chamber, will exceed the minimum ignition temperature of the gases regardless of varying pressures in the atmosphere or within the afterburner. Since the mixture of incoming air and partially combusted, or "fuel rich," hot gases from the primary combustion chamber will spontaneously reignite if a flameout should occur, this feature of the present invention will overcome all manner of ignition problems.

In flight, an air-breathing rocket will maintain reasonably constant speed through varying densities of air, such as between lower and higher altitudes. When the air density decreases, the mass flow of overall exhaust gases leaving the rocket and the thrust of the rocket will decrease. But since the drag and skin-friction are also decreased at lower air densities, the rocket vehicle will automatically maintain reasonably constant speed. Also, in an air-breathing ducted rocket there will be considerably less variation of thrust with Mach number than in a ramjet-type propulsion system, since at least part of the oxidizer required for combustion of the propellant may be self-contained within such a rocket.

Some embodiments of the air-breathing rocket motors herein described are self-accelerating. A feature of these embodiments is the use of more than one propellant charge, or of a single charge having multiple layers of propellants of varying oxidizer content to provide a composite charge. A propellant having a high ratio of oxidizer to fuel may be burned first to provide acceleration during flight at lower velocities. After a velocity at which the air inlet diffuser functions efficiently has been attained, a propellant of lower oxidizer content will burn to sustain the velocity reached after the first burning stage.

It is clear that an air-breathing solid propellant ducted rocket has many advantages over ramjets or other such similar air-breathing propulsion devices. Furthermore, it should be clear from what is said here and is shown in the accompanying drawings, which show certain forms in which the invention may be embodied, that the ducted rocket of the invention is particularly distinct from that type of air-breathing solid propellant rocket sometimes referred to as a "ram-air rocket engine," as exemplified in U.S. Patent Number 2,799,987 entitled "Solid Fuel Ramjet Projectiles." A "ducted rocket," as the term is used herein, is one which comprises a rocket motor generating incompletely combusted fuel gases, in combination with an air duct, and a combustion chamber in which said fuel gases are burned with air. Clearly this is different and distinct from a solid propellant charge through or around which rammed air is ducted.

A better understanding and fuller appreciation of the many advantages of the invention may be had by referring to the accompanying drawings, which illustrate rocket motors incorporating several different embodiments of the present invention, and wherein:

FIGURE 4 is an axial section through still another modification of the rocket of FIGURE 1, in which modification a composite propellant charge is used; and FIGURE 5 is a transverse section, taken on the line 5—5 of FIGURE 4, and further showing the arrangement of the propellant charge within the rocket casing.

Figure 1:
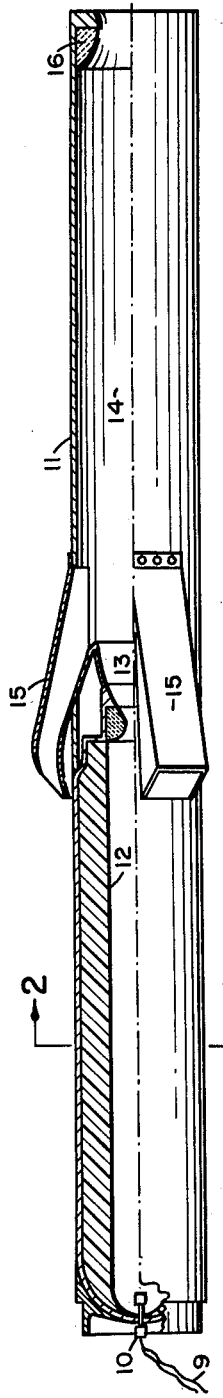
FIGURE 1 is a side elevation, partly in longitudinal section, of a rocket motor showing the arrangement of the propellant chamber therein and the lateral air scoops which conduct air to a point near the discharge end of the propellant chamber.

FIGURE 1 shows a rocket comprising casing 11 having in an anterior portion thereof propellant charge 12. In the nose of the casing 11 is igniter 10 for igniting charge 12. Igniter 10 comprises a small explosive charge activated electrically through wires 9, and has a conventional structure. Aft of charge 12 is a nozzle 13, which directs gases formed by the burning of propellant charge 12 rearward into chamber 14. Regularly spaced about the periphery of casing 11 are three air scoops 15 which lead air into chamber 14, where it is mixed and combines with the gases produced by partial combustion of the propellant. These products of further combustion leave the rocket casing 11 through nozzle 16, advantageously made of a heat-resistant material.

Figure 2:
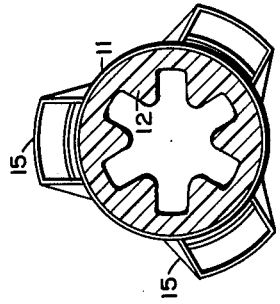
FIGURE 2 is a transverse section, taken on the line 2—2 of FIGURE 1, showing the internal configuration of the propellant charge and the inlet ends of the air scoops.

In FIGURE 2, casing 11, propellant charge 12, and scoops 15 are further shown. The propellant charge, in this case, has an internal radial-burning star shaped configuration, but such is not critical to the invention.

Figure 3:
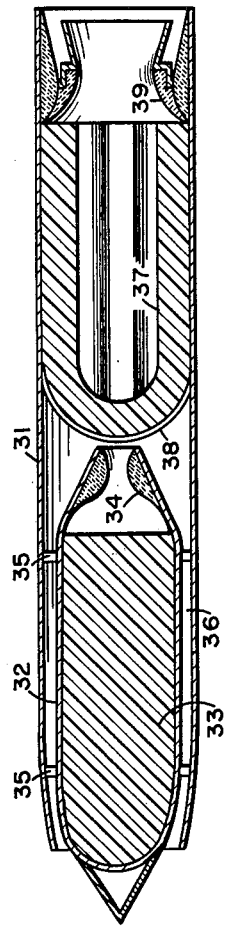
FIGURE 3 is an axial section through a modified type of air-breathing rocket having two rocket engines within an air-ducted casing.

FIGURE 3 shows an embodiment comprising an exterior rocket casing 31 having in its forward portion an interior casing 32 containing propellant charge 33. Casing 32 terminates in nozzle 34, and is supported within exterior casing 31 by a series of regularly spaced lugs 35. exterior casing 31 and interior casing 32 define an air duct 36 which leads air from forward portions of the rocket to aft portions thereof. As shown in FIGURE 3, these aft portions of the rocket are initially occupied by another propellant charge 37, separated from the remainder of the rocket by a bulkhead or retaining wall 38. Gases produced by combustion of this charge 37 impart thrust to the rocket through nozzle 39 in which exterior casing 31 terminates. In operation of the embodiment shown, aft propellant charge 37, which is chosen to be a high-thrust propellant containing a high ratio of oxidizer to fuel, is first ignited. The thrust generated by escape of the combustion gases through nozzle 39 accelerates the rocket to high velocities. At a predetermined time, propellant charge 33, which is low in oxidizer content, is ignited by igniter means known to the art and not shown in FIGURE 3. The heat generated by combustion of charge 33 or charge 37, or both, ignites bulkhead 38, which is of a sturdy but combustible material, for example magnesium metal. Now the partially oxidized gases from the burning charge 33 mix with air passing through duct 36 at high speed, and complete oxidation of the fuel occurs in aft portions of the rocket in a combustion chamber formerly occupied by propellant charge 37. The combustion products produce further thrust on their emission from nozzle 39.

FIGURE 4 illustrates an air breathing ducted rocket having a frontal air scoop. The ducted rocket comprises an exterior cylindrical casing 41, and an interior casing 42 containing therein a composite propellant charge comprising a propellant 43 having a high ratio of oxidizer to fuel and propellant 49 containing less oxidizer than is required for complete combustion. Casing 42 terminates in nozzle 44. Casings 41 and 42 define between them air duct 45, and are fixed in their relative position by lugs 46 regularly spaced around the circumference of casing 42. Air passing through air duct 45 as well as gases emanating from nozzle 44 enter combustion chamber 47, where air and partially burned fuel of the propellant are mixed, combine further, and escape from casing 41 through nozzle 48. The use of a layered propellant charge, as shown in FIGURE 4, is advantageous for ground launching of the ducted rocket. The oxidant rich propellant 43 of the charge accelerates the rocket to velocities at which the air inlet diffuser becomes fully operative, after which the partial combustion of propellant 49 of the charge supplies fuel rich gases for further combustion with air within combustion chamber 47.

FIGURE 5 further shows exterior casing 41, interior casing 42, air duct 45, supports 46, and propellant charge 49, which in this case is end-burning, rather than radial burning.

Many kinds and compositions of solid propellants can be used in construction of air-breathing rockets. It is advantageous, however, to employ a propellant composition which is castable, i.e., readily convertible from a liquid to a solid by curing (or otherwise) in situ inside the rocket casing. These materials are preferably in a sufficiently fluid state prior to casting to be poured or extruded into the casing. A temporarily inserted core may be used to get internal configurations, if desired. The propellant is preferably one whose burning rate is uniform and predictable and which undergoes a minimum of dimensional changes upon curing, evolving few or no gaseous reaction products on curing. Other advantageous features of the propellant are physical strength, ability to withstand shock, and retention of elasticity over a wide range of temperatures.

For example, a satisfactory propellant for the purposes of the invention comprises as a fuel an epoxide-cured acrylo-butadiene copolymer of the type disclosed in copending application Serial No. 707,444, filed January 6, 1958, but a wide variety of other suitable fuels are known to the art for compounding propellants for rocket motors. In such propellants comprising organic polymer and copolymer fuels, the amount of oxidizer incorporated therewith can be varied so that multiple layers of propellant can be cast, either superimposed on one another or placed end to end or in any one of many combinations. As oxidizers, perchlorate salts such as ammonium perchlorate are commonly used, as known in the art, but a variety of other solid oxidizers, for example nitrate salts, are known to the art as suitable.

Turning now to the matter of the relative proportions of oxidizer and fuel-binder to be used, these proportions vary somewhat as a function of the nature of the components of the propellant. In general it is desirable that the fuel-rich propellant contain the minimum quantity of oxidizer that will support combustion. On the other hand, sufficient oxidizer should be used to make sure that continuous combustion is achieved. While it is possible to use as little as about 40 percent by weight of oxidizer, it has been found that preferred results are obtained when the propellant contains about 50 percent by weight of oxidizer.

For an oxidizer-rich propellant, such as the charge 37 of the rocket of FIGURE 3, the quantity of oxidizer may be the same as that commonly used in solid rocket propellants, i.e. about 60 percent to 70 percent by weight.

In a rocket containing both fuel-rich and oxidizer-rich propellants the size of the high oxidizer content propellant charge required to achieve minimum velocity and acceleration, so that operation as an air-breathing rocket can begin, can be readily determined. Such a structure renders a ducted rocket like that shown in FIGURE 4 particularly suitable for ground-to-air launching. If the propellant is uniformly low in oxidizer content, then the rocket is advantageously adapted for an air launching.

An extensive description of the performance parameters of air-breathing ducted rockets in simulated and actual flight is to be found in the monograph "The Solid Propellant Ducted Rocket Propulsion System," published in June 1959 by the Thiokol Chemical Corporation, Redstone Division, Redstone Arsenal, Huntsville, Alabama.

Although specific embodiments have been herein shown and described, it is to be understood they are illustrative, and are not to be construed as limiting on the scope and spirit of the invention.

I claim:

1. A solid propellant, air-breathing ducted rocket comprising a first cylindrical motor casing; a first rocket motor in rearward portions of said first motor casing, said first rocket motor being defined by the walls of said first motor casing and a combustible bulkhead between said walls, said first rocket motor containing a first-burning case-bonded solid propellant fuel having dispersed therein an amount of solid oxidizer sufficient for complete combustion and further having first rearward nozzle means including a uniformly constricted throat portion; a second rocket motor comprising a second motor casing mounted in forward portions of said first motor casing, said second rocket motor containing a second-burning case-bonded solid propellant fuel having dispersed therein an amount of solid oxidizer insufficient for complete combustion of said fuel but sufficient to support continuous combustion in the absence of air, said second motor further having second rearward nozzle means including a uniformly constricted throat portion; and air inlet means communicating between the atmosphere and central interior portions of said first motor casing forward of said combustible bulkhead.

2. A rocket as in claim 1 wherein said first motor casing is open to the atmosphere at its forward end, and wherein said second motor casing is axially mounted in said first motor casing to leave an air passage communicating between the open forward end of said first motor casing and said central interior portions thereof, to define said air inlet means.

References Cited by the Examiner

UNITED STATES PATENTS

| | | |
|---|---|---|
| 1,103,503 | 7/14 | Goddard. |
| 2,419,866 | 4/47 | Wilson _____ 60—35.6 X |
| 2,600,678 | 6/52 | O'Neill _____ 102—98 |
| 2,799,987 | 7/57 | Chandler _____ 60—35.6 |
| 2,912,820 | 11/59 | Whitmore _____ 60—35.6 |
| 2,926,613 | 3/60 | Fox _____ 60—35.6 |
| 2,952,122 | 9/60 | Fox _____ 60—35.6 |
| 2,987,875 | 6/61 | Fox _____ 60—35.6 |

FOREIGN PATENTS

| | | |
|---|---|---|
| 166,258 | 7/21 | Great Britain. |
| 749,009 | 5/56 | Great Britain. |

OTHER REFERENCES

"Astronautics," March 1958, pages 30, 31 and 78–83.

"Aviation Week," October 7, 1957, pages 50, 51, 52, 54, 57 and 59.

A Quasi-Morphological Approach to the Geometry of Charges for Solid Propellant Rockets: The Family Tree of Charge Designs, by J. M. Vogel, "Jet Propulsion," published by the American Rocket Society Inc., February 1956, pages 102–105.

SAMUEL LEVINE, *Primary Examiner*.

SAMUEL FEINBERG, *Examiner*.